United States Patent
Gaully et al.

(10) Patent No.: US 10,571,316 B2
(45) Date of Patent: Feb. 25, 2020

(54) METHOD AND SYSTEM FOR DETERMINING THE FLOW RATE OF AIR COLLECTED FROM AN AIRCRAFT ENGINE

(71) Applicant: SAFRAN AIRCRAFT ENGINES, Paris (FR)

(72) Inventors: Bruno Robert Gaully, Marolles en Hurepoix (FR); Vincent Cabret, Paris (FR); Amaury Olivier, Boulogne-Billancourt (FR); Jerome Guy Roger Sebaa, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 360 days.

(21) Appl. No.: 14/441,065

(22) PCT Filed: Oct. 31, 2013

(86) PCT No.: PCT/FR2013/052608
§ 371 (c)(1),
(2) Date: May 6, 2015

(87) PCT Pub. No.: WO2014/072619
PCT Pub. Date: May 15, 2014

(65) Prior Publication Data
US 2015/0268073 A1    Sep. 24, 2015

(30) Foreign Application Priority Data

Nov. 9, 2012 (FR) ..................... 12 60630
Nov. 9, 2012 (FR) ..................... 12 60632

(51) Int. Cl.
*G01F 1/34*    (2006.01)
*G01M 15/04*    (2006.01)

(52) U.S. Cl.
CPC ............. *G01F 1/34* (2013.01); *G01M 15/042* (2013.01)

(58) Field of Classification Search
None
See application file for complete search history.

(56) References Cited

U.S. PATENT DOCUMENTS 3,784,130 A * 1/1974 Robinson ............... B64D 31/00
244/76 J
4,697,238 A * 9/1987 Barbeau .................... F02C 7/22
60/243

(Continued)

FOREIGN PATENT DOCUMENTS

EP    0507725 A1    10/1992
EP    1116655 A2    7/2001

(Continued)

OTHER PUBLICATIONS

U.S. Appl. No. 13/743,623, filed Jan. 17, 2013, US2013-0186096A1, Brice Andre, et al.

(Continued)

*Primary Examiner* — Khaja Ahmad
(74) *Attorney, Agent, or Firm* — Oblon, McClelland, Maier & Neustadt, L.L.P.

(57) ABSTRACT

A method and a device for determining, in real time, the flow rate of air collected from an aircraft engine by a system for collecting air from the engine, including an acquisition device for acquiring at successive times measurements of physical quantities in respect of temperature, pressure and pressure loss, specific for the air collection system, a computing device for evaluating at each current time of the successive times a first current estimation of the flow rate of air collected from the aircraft engine on the basis of the physical quantity measurements, the acquisition device for acquiring at the current time a minimum current air flow rate (Continued)

data item defined on the basis of a predetermined flow rate tables, the computing device for hybridising, at the current time, the first current air flow rate estimation and the minimum current air flow rate data item to form a second current air flow rate estimation.

9 Claims, 9 Drawing Sheets

(56) References Cited

U.S. PATENT DOCUMENTS

| | | | | |
|---|---|---|---|---|
| 5,155,991 | A * | 10/1992 | Bruun | B64D 13/04 454/74 |
| 5,934,083 | A | 8/1999 | Scherer et al. | |
| 6,880,784 | B1 * | 4/2005 | Wilkinson | B64D 31/06 244/76 R |
| 2001/0007337 | A1 * | 7/2001 | Buchholz | B64D 13/00 236/49.1 |
| 2003/0131605 | A1 * | 7/2003 | Meisner | F02C 9/28 60/773 |
| 2009/0125164 | A1 * | 5/2009 | Perrotta | G01C 23/00 701/3 |
| 2009/0193811 | A1 | 8/2009 | Monteiro et al. | |
| 2011/0000287 | A1 * | 1/2011 | Bacic | F16K 37/0083 73/112.01 |
| 2013/0031949 | A1 * | 2/2013 | Gaully | F01D 17/08 73/1.57 |
| 2013/0186096 | A1 | 7/2013 | Andre et al. | |

FOREIGN PATENT DOCUMENTS

| | | |
|---|---|---|
| WO | 2009/094734 A2 | 8/2009 |
| WO | 2011/101579 A1 | 8/2011 |

OTHER PUBLICATIONS

U.S. Appl. No. 14/409,091, filed Dec. 18, 2014, Vincent Cabret, et al.
International Search Report dated Apr. 4, 2014 in PCT/FR2013/052608 filed Oct. 31, 2013.
French Search Report dated Jul. 24, 2013 in French Application 1260630 filed Nov. 9, 2012.
French Search Report dated Jul. 24, 2013 in French Application 1260632 filed Nov. 9, 2012.

* cited by examiner

METHOD AND SYSTEM FOR DETERMINING THE FLOW RATE OF AIR COLLECTED FROM AN AIRCRAFT ENGINE

FIELD OF THE INVENTION

The present invention relates to the evaluation of the flow rate of air collected from an aircraft engine, the knowledge whereof helps ensure satisfactory operability of the engine.

STATE OF THE RELATED ART

In a known manner, an aircraft needs to collect air from at least one engine to for example pressurise the cabin thereof or de-ice the wings thereof. However, collecting air impacts engine control and thus fuel flow rate regulation.

Indeed, the fuel injection flow rate needs to be increased when collecting air to be able to provide the same engine thrust. It should be noted that fuel injection flow rate regulation is performed by a feedback loop which is intended to ensure that the flow rate of fuel injected into the combustion chamber, in the acceleration or deceleration phase, does not exceed a certain limit value above which engine malfunction may be encountered.

Indeed, to operate an aircraft engine and more particularly the high-pressure compressor HP thereof, a threshold protection value known as an acceleration stop is implemented.

The acceleration stop is determined on the basis of limits relating to the ratio $C/P_c$ of the fuel flow rate C injected into the combustion chamber over the static pressure $P_c$ measured at the combustion chamber output. These limits are set, in a manner known per se, to protect against pumping in acceleration and engine shutdown in deceleration.

FIGS. 8A-8D represent the variations of the ratio $C/P_c$ according to the normalised speed $X_N$ of the compressor based on various configurations.

Figure 8A:
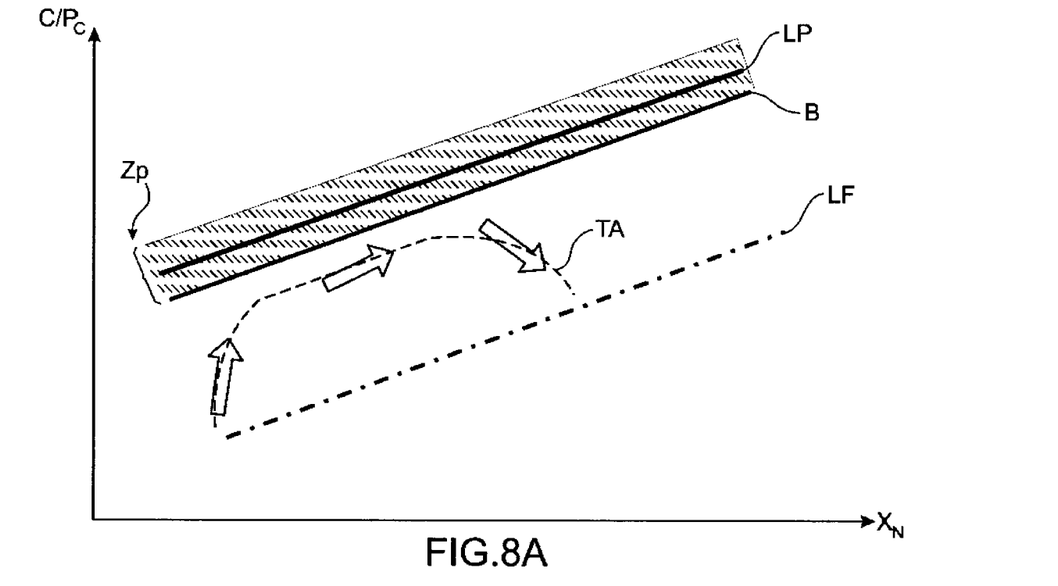
FIGS. 8A-8D represent the acceleration stop variations on the basis of the engine speed.

In FIG. 8A, the curve LP represents the engine pumping line and ZP the zone wherein a pumping risk exists. The curve B represents the acceleration stop and the curve LF (dotted lines) represents the operating line. The curve TA represents an acceleration trajectory required by the engine.

This representation in the plane $(C/P_c, X_N)$ makes it possible to obtain an image of the intrinsic operation of the compressor HP by means of measurable parameters $C/P_c$ and $X_N$. In particular, the acceleration stop B conveys the control and protection of the compressor against pumping.

Figure 8B:
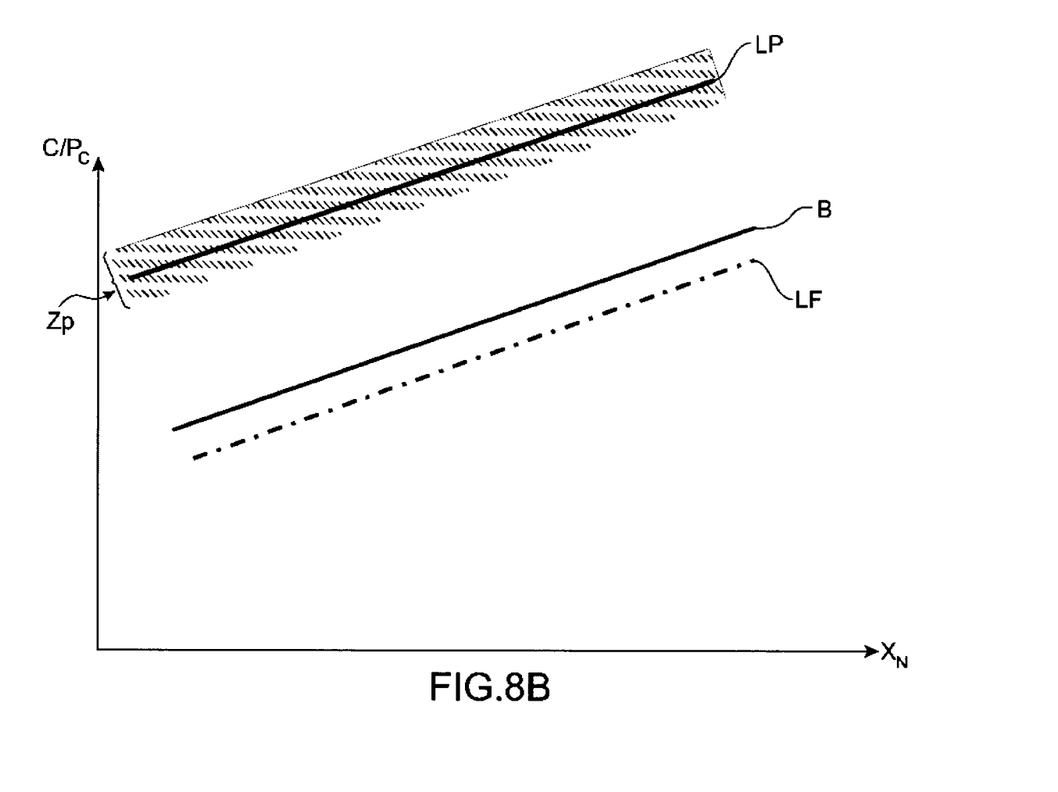

However, collections of air on the compressor HP modify the representation in the plane $(C/P_c, X_N)$ as illustrated in FIG. 8B.

Indeed, FIG. 8B shows that to maintain power, collections of air are compensated by more fuel in the combustion chamber, which raises the operating line LF and the pumping line in $C/P_c$. On the other hand, the acceleration stop B which is computed on the basis of the normalised speed $X_N$ remains independent of the air collections.

Consequently, the deviation between the operating line LF and the acceleration stop B is reduced in proportion to the air collection. As such, the margin between the operating line LF and the stop line B representing the capacity of the engine to accelerate is degraded during collections of air. There is even a risk of underspeed on the engine, which may even result in the shutdown thereof.

It is thus necessary to recompute the stop B to be consistent with the new compressor status induced by collecting air so as to retain a satisfactory acceleration margin. However, it is important not to overestimate the air flow rate collected so as not to over-correct the stop B.

Figure 8C:
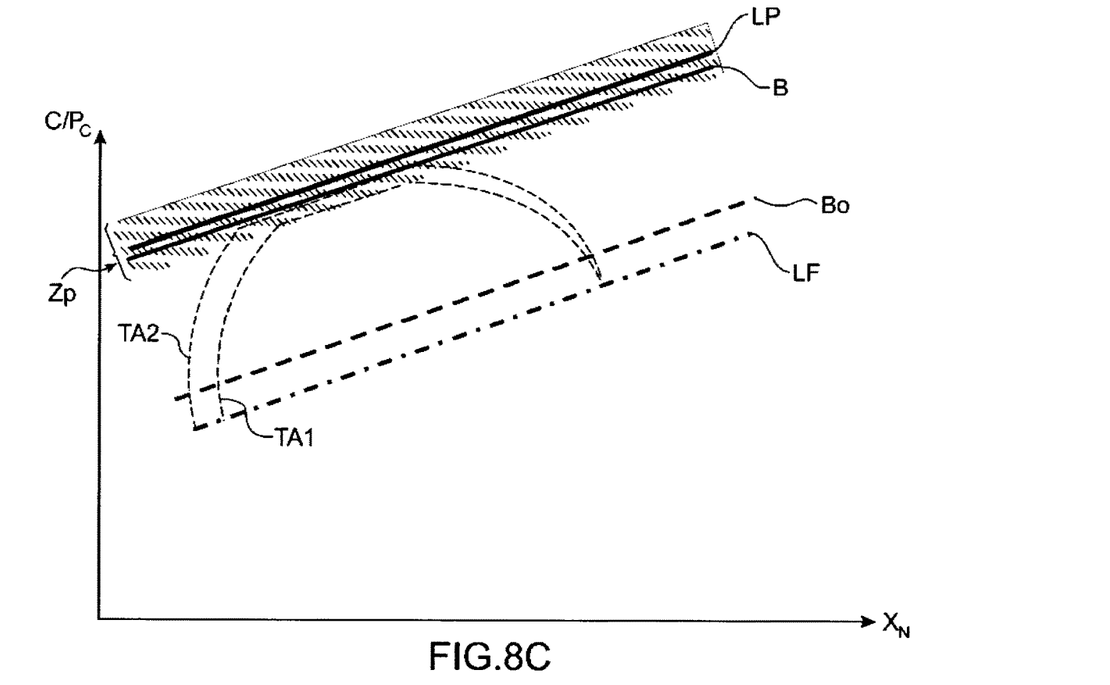

Indeed, FIG. 8C represents the various curves in the plane $(C/P_c, X_N)$ based on a collected air flow rate overestimation scenario.

A first acceleration trajectory TA1 shows the acceleration limit required by the engine and a second acceleration trajectory TA2 shows the acceleration limit induced by overestimating the air flow rate. The curve $B_0$ represents the former acceleration stop.

This figure shows that overestimating the air flow rate gives rise to an excessively high acceleration stop B capable of entering the pumping zone ZP. As such, overestimating the collected flow rate may give rise to a loss of pumping protection during acceleration (curve TA2).

Figure 8D:
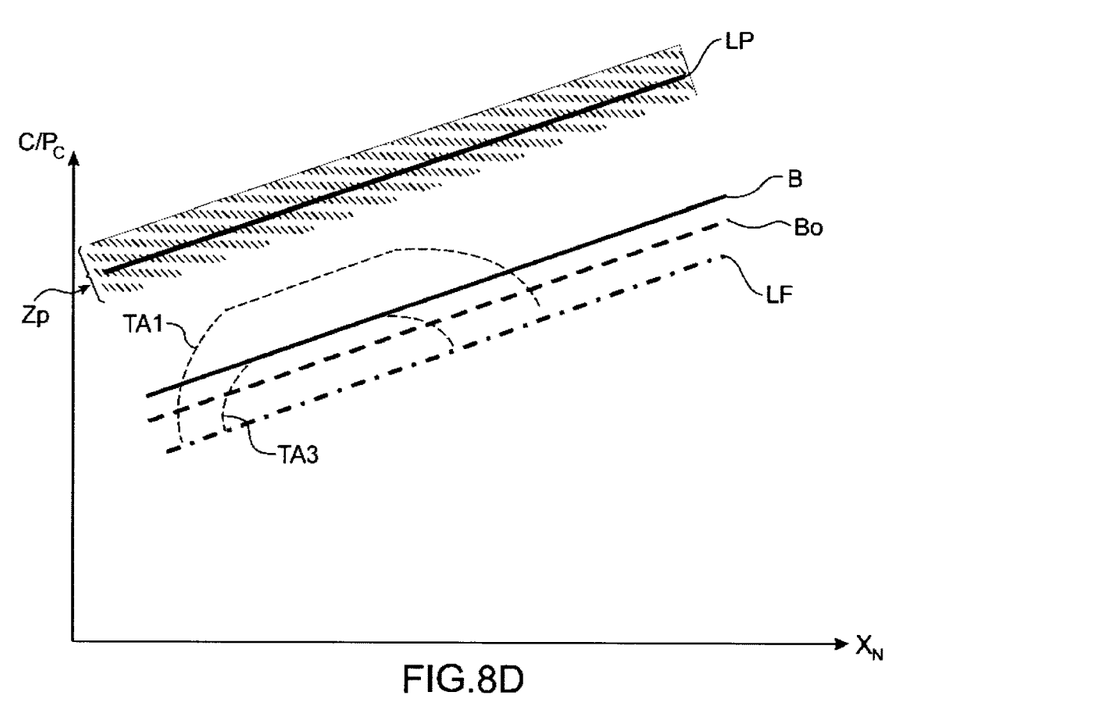

Furthermore, FIG. 8D shows that underestimating the collected flow rate goes along the same lines as a lack of correction of the stop B. Underestimating the air flow rate gives rise to an insufficiently high stop B, still too close to the operating line LF. As the engine needs to increase fuel injection in order to maintain the same engine speed, there is a risk of engine underspeed (acceleration curve TA3).

As such, the operability of the engine can only be ensured with correct knowledge of the collections of air carried out on this engine.

It should be noted that, in the context of a conventional airliner engine, the air collections are determined on the basis of the altitude using set-point tables provided by the aircraft manufacturer.

On the other hand, in the context of a new generation of engines and aircraft, it is not possible to predetermine an air flow rate table. Indeed, new engines optimise the output of the compressor and reduce fuel consumption and this requires superior precision in respect of estimating the level of air collection. Furthermore, in order to prevent common malfunction modes between engines on the same aircraft, the data used by these types of engines are increasingly independent of those of the aircraft. Similarly, for new aircraft, the air collection requirements for de-icing have become more complex and have multiplied. In these cases, the air flow rate collected on the engine is computed on the basis of an analytical model. It should be noted that the air flow rate may vary over a range from approximately 10 kg/min to approximately 100 kg/min.

However, a lack of precision on the knowledge of the air flow rate collected may thus impact the operability of the engine.

The aim of the present invention is that of remedying the drawbacks mentioned above by proposing a method and a system for determining precisely and in real time the flow rate of air collected from the engine, helping enhance engine operability.

DESCRIPTION OF THE INVENTION

The present invention is defined by a method for determining, in real time, the flow rate of air collected from an aircraft engine by a system for collecting air from the engine, comprising the following steps:
  acquisition at successive times of measurements of physical quantities in respect of temperature, pressure and pressure loss, specific for the air collection system,
  evaluation at each current time of said successive times of a first current air flow rate estimation of air collected from the aircraft engine on the basis of said physical quantity measurements,
  acquisition at said current time of a minimum current air flow rate data item defined on the basis of the predetermined flow rate tables, hybridisation at said current time of said first current air flow rate estimation and of said minimum current air flow rate data item to form a second current air flow rate estimation.

The method makes it possible to optimise the information derived from the flow rate tables supplied by the aircraft manufacturer and the estimations derived from the measurements of the various physical quantities so as to determine with sufficient precision the flow rate of air collected over the entire air flow rate range that can be envisaged. This precision in respect of knowledge subsequently makes it possible to correct the acceleration stop effectively.

Advantageously, said hybridisation comprises the selection of the greatest value between said first current air flow rate estimation and said minimum current air flow rate data item.

This makes it possible to determine the air flow range simply and with satisfactory precision over the entire range.

Advantageously, the method comprises a determination at said current time of a third current air flow rate estimation by increasing said second current air flow rate estimation by an additional current anti-ice nacelle air flow rate value collected from the engine.

This makes it possible to correct the current air flow rate estimation further by optimising the non-deterministic anti-ice air flow rate data.

Advantageously, the method comprises a consolidation of said physical quantity measurements before the evaluation of said first current air flow rate estimation.

This makes it possible to ensure the validity of the measurements before using said measurements to evaluate the flow rate of air collected from the engine.

Advantageously, the evaluation of said first current estimation comprises the following steps:
  computation at said current time of an intermediate current estimation of the flow rate of air collected from the aircraft engine on the basis of said physical quantity measurements,
  computation at said current time of a current flow rate error induced by uncertainties in respect of said physical quantity measurements, and
  correction at said current time of said intermediate current flow rate estimation by subtracting therefrom said current flow rate error thus determining said first current air flow rate estimation.

This makes it possible to ensure that the value of the flow rate of air collected is never overestimated and thus maximise the shift of the regulation stop without generating a risk of pumping when collecting air from the engine.

Advantageously, the pressure loss is measured at the terminals of a heat exchanger of said air collection system.

This makes it possible to increase the precision of the air flow rate evaluation given that the heat exchanger displays the greatest pressure loss.

Advantageously, said flow rate tables are air collection set-points for conditioning the aircraft cabin and said minimum current air flow rate data item is defined on the basis of the configuration selected in said flow rate tables and the aircraft altitude.

The invention also relates to a method for monitoring an aircraft engine, comprising:
  a real-time estimation of the flow rate of air collected from an aircraft engine according to any of the above features, and
  an adjustment of a current fuel flow rate threshold value of said engine accounting for the first, second or third current air flow rate estimation so as to retain an acceleration margin.

This makes it possible to correct, in real time and effectively, the fuel regulation stop without generating a pumping risk.

The invention also relates to a device for determining, in real time, the flow rate of air collected from an aircraft engine by a system for collecting air from the engine, comprising:
  acquisition means for acquiring at successive times measurements of physical quantities in respect of temperature, pressure and pressure loss, specific for the air collection system,
  computing means for evaluating at each current time of said successive times a first current estimation of the flow rate of air collected from the aircraft engine on the basis of said physical quantity measurements,
  acquisition means for acquiring at said current time a minimum current air flow rate data item defined on the basis of the predetermined flow rate tables, and
  computing means for hybridising, at said current time, said first current air flow rate estimation and said minimum current air flow rate data item to form a second current air flow rate estimation.

The invention also relates to a computer for monitoring an aircraft engine configured to implement the determination method according to the above features.

DETAILED DESCRIPTION OF PARTICULAR EMBODIMENTS

The underlying concept of the invention consists of comparing in real time various sources of information on the flow rate of air collected from the aircraft engine to determine a precise estimation of the air flow rate so as to correct the acceleration stop correctly and hence enhance engine operability and protection.

Figure 1:
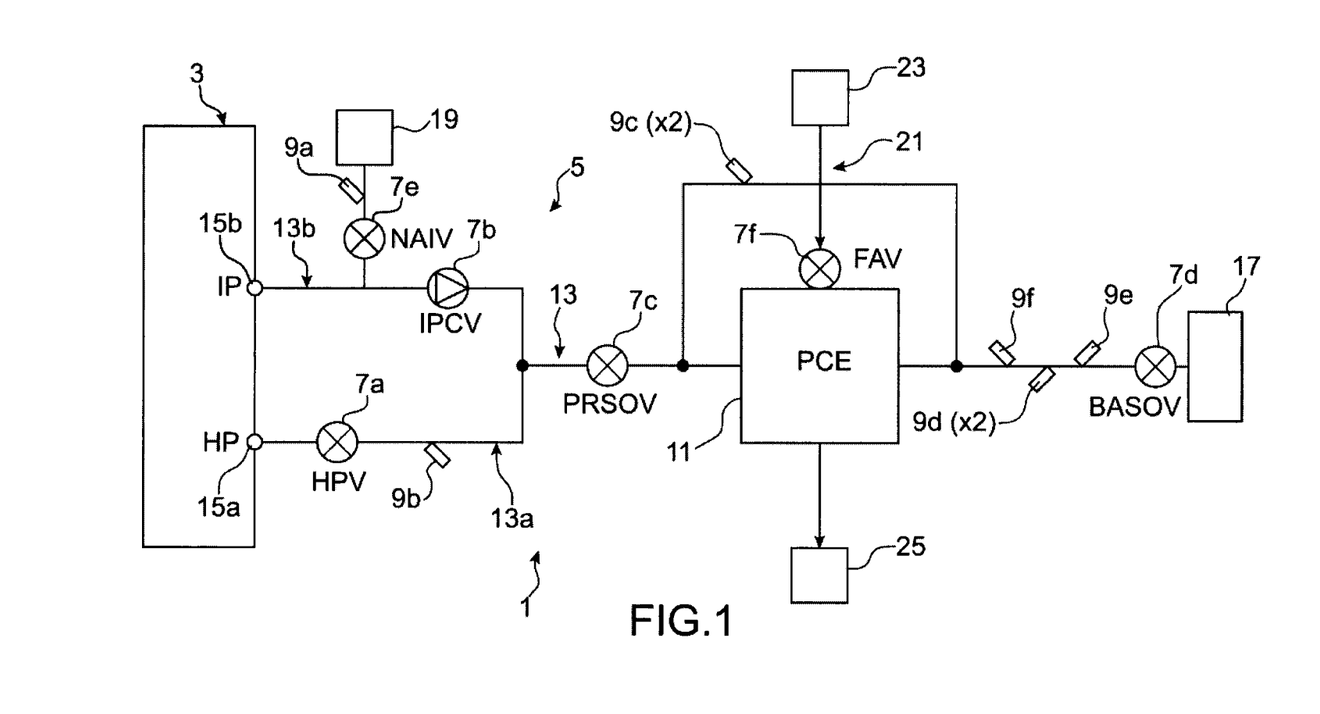
FIG. 1 schematically illustrates a system for collecting air from an aircraft engine, according to the invention.

FIG. 1 schematically illustrates a system for collecting air from an aircraft engine, according to the invention.

The air collection system "BAS" (Bleed Air System) 1 is included in the propulsion system (engine and nacelle) of the aircraft and is intended to collect air on the high-pressure HP compressor 3 of the engine so as to subsequently deliver said air to the aircraft or at the engine input.

Indeed, the air collection system (BAS) 1 comprises an air distribution circuit 5 comprising valves 7a-7f, sensors 9a-9f, a heat exchanger 11, and a set of channels 13 connecting the first and second ports 15a, 15b for collecting air on the HP compressor 3 to, on one hand, a pneumatic distribution system 17 of the aircraft and, on the other, an engine anti-ice nacelle 19. The first air collection port 15a is a high-pressure port (or HP port) of the compressor 3 whereas the second air collection port 15b is an intermediate pressure port (or IP port) of the compressor 3.

A first valve 7a, or "HPV" valve (High Pressure Valve), is mounted on a first branch (channel 13a) of the circuit 5 wherein one of the ends is connected to the HP port of the compressor 3. A second valve 7b, or "IPCV" valve (Intermediate Port Check Valve), is mounted on a second branch (channel 13b) of the circuit 5 wherein one of the ends is connected to the IP port of the compressor 3. The other ends of the first 13a and second 13b branches are connected via a third valve 7c, or PRSOV valve (Pressure Shut-Off Valve), at the input of the heat exchanger 11 for precooling "PCE" (Precooler).

It should be noted that the PRSOV valve 7c may be controlled to saturate the level of pressure at the aircraft interface or to shut off the air supply to the aircraft.

The output of the heat exchanger PCE 11 is connected via a fourth valve 7d, or "BASOV" valve (Bleed Air Shut-Off Valve), to the pneumatic distribution system 17 of the aircraft.

Furthermore, the second branch 13b of the circuit 5 is also connected via a fifth valve 7e, or "NAIV" valve (Nacelle Anti-Ice Valve) to the anti-ice nacelle 19 of the engine input. The NAIV valve 7e is intended to control the activation of the de-icing of the engine air input and is monitored by a first pressure sensor 9a, or PNAI sensor.

It should be noted that the HPV valve 7a in conjunction with the IPCV valve 7b make it possible to define the air collection port 15a, 15b. As such, when the HPV valve 7a is opened, air is collected on the port 15a (HP port) and the IPCV valve 7b is closed by pressure. Conversely, when the HPV valve 7a is closed, the air is collected on the port 15b (IP port). Furthermore, a second pressure sensor 9b, or PHPV sensor, is mounted on the first branch 13a to monitor the HPV valve 7a.

The PCE air/air heat exchanger 11 is a heat sink for regulating the air temperature at the aircraft interface. Indeed, the PCE 11 is connected via a sixth valve 7f "FAV" (Fan Air Valve) to another air circuit 21 collecting air from the engine fan 23 and discharging said air to a nacelle output port 25. The FAV valve 7f makes it possible to modulate the flow rate of air collected from the fan 23 so as to cool the air in the distribution circuit 5 intended for the aircraft.

Furthermore, further sensors are installed on the air collection system 1 (BAS) to measure the specific physical quantities for air collection. In particular, a pair of third differential pressure sensors 9c, or DPBAS sensors, are connected to the terminals of the PCE 11 to measure the pressure loss based on two independent channels. It should be noted that measuring the pressure loss at the point where it is greatest (i.e. in the PCE) makes it possible to increase the precision of the collected air flow rate estimation. Furthermore, measuring the pressure loss at the terminals of the PCE 11 avoids inserting a differential pressure device at the terminal whereof the pressure loss would be measured. A differential pressure device would require an increase in the pressure at the collection ports 15a, 15b which would degrade the performance of the engine by increasing fuel consumption. Furthermore, such a device would give rise to increased mass and volume of the PCE 11 so as to compensate for an increase in temperature at the collection ports 15a, 15b.

Furthermore, three temperature sensors 9d, 9e, or TBAS sensors, are mounted downstream (i.e. at the output) from the PCE 11 to measure and monitor the air temperature at the aircraft interface. Finally, a fourth simplex pressure sensor 9f, or PBAS sensor, is also mounted downstream from the PCE 11 to measure the pressure at the output of the PCE 11 to monitor the correct operation of the PRSOV valve 7c at the aircraft interface.

Figure 2:
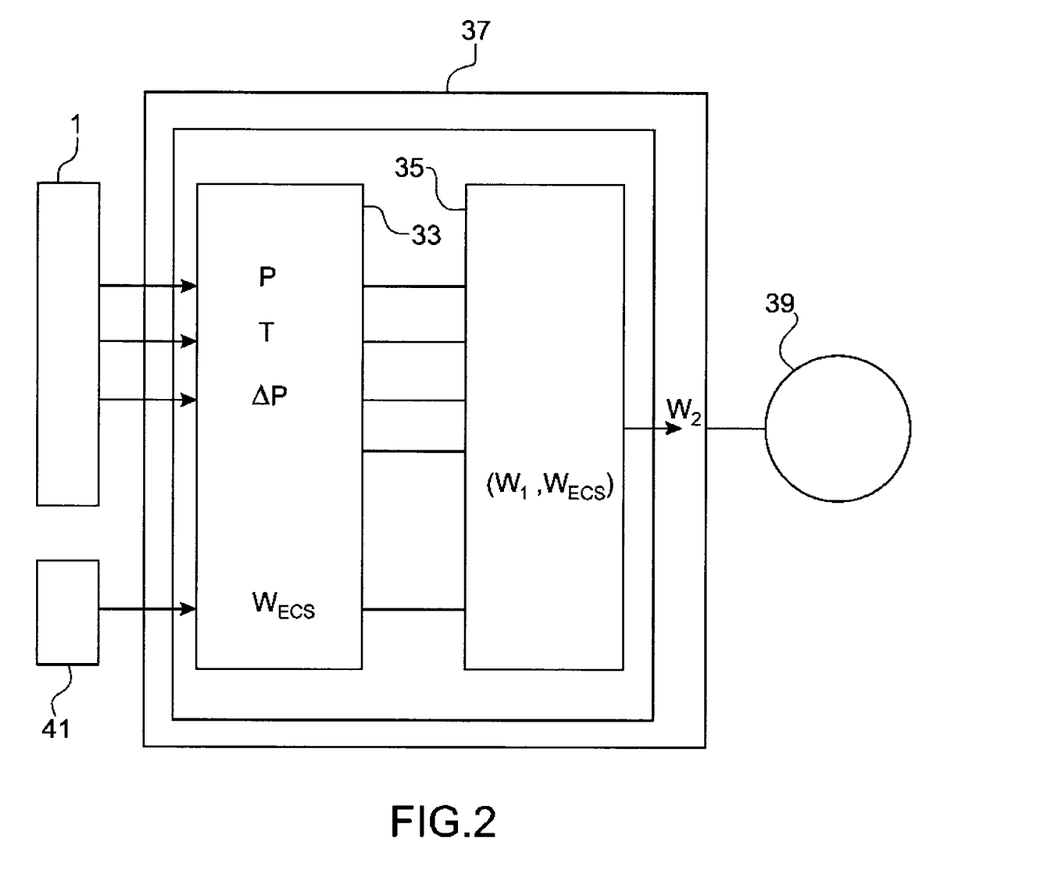
FIG. 2 schematically illustrates a method and a device for determining, in real time, the flow rate of air collected from the engine, according to the invention.

FIG. 2 schematically illustrates a device for determining, in real time, the flow rate of air collected from the engine, according to the invention. FIG. 2 also illustrates the method for estimating the air flow rate in real time, according to the invention.

The determining device 31 is a digital module comprising acquisition means 33 and computing means 35, integrated in a feedback and control computer 37 (for example FADEC) of an aircraft engine 39. More particularly, the determining device 31 comprises a computer program according to the invention comprising code instructions suitable for implementing the steps of the estimation method according to the invention, stored for example in a memory of the computer 37 for controlling the engine 39.

The acquisition means 33 are configured to acquire at successive times the physical quantity measurements from the sensors installed in the air collection system (BAS) 1. These measurements comprise measurements initially intended to monitor the BAS system 1, in particular, the temperature measurements T provided by the temperature sensors 9e, 9d and the pressure measurements P provided by the pressure sensor 9f. They also comprise pressure loss measurements ΔP at the terminals of the heat exchanger (PCE) 11 provided by the differential pressure sensors 9c.

Figure 7:
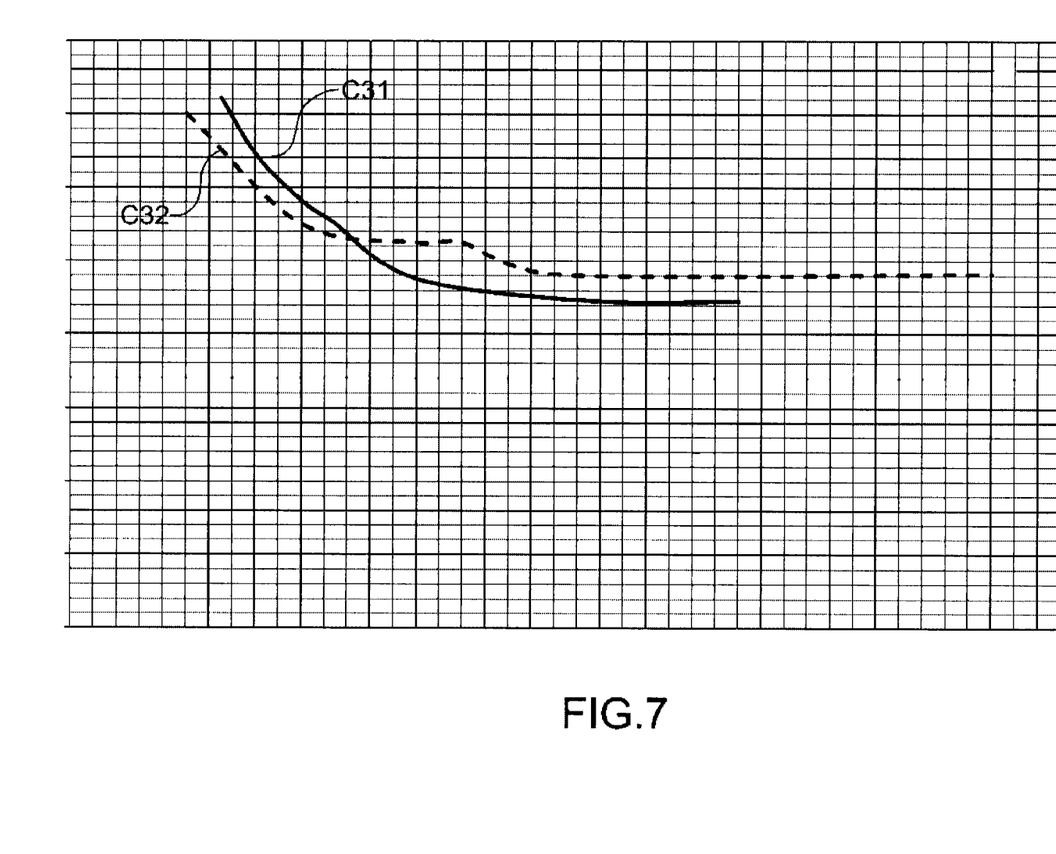
FIG. 7 is a graph showing the errors made on the basis of the flow rate of air collected.

Advantageously, the physical quantity measurements may be consolidated before the use thereof for evaluating the flow rate of air collected from the engine (see FIG. 7).

It should be noted that the experimental calibration tests conducted on the PCE exchanger 11 made it possible to establish an empirical formula expressing the mass flow rate W in respect of air collection as a function of the pressure loss ΔP in the PCE 11 and the temperature T and pressure P at the output of the PCE 11, based on the following formula:

$$k \times W^\alpha = \Delta P \times \left( \frac{P + \frac{\Delta P}{2}}{T} \right) \quad (1)$$

the parameters α and k are experimental constants determined on the basis of the calibration tests conducted on the PCE exchanger PCE 11.

As such, in order to estimate the mass flow rate in real time, the computing means 35 evaluate at each current time of the successive times a first current estimation $W_1$ of the mass flow rate of air collected from the aircraft engine 39 on the basis of the measurements in respect of pressure loss ΔP, pressure P and temperature T compiled by the acquisition means 33.

Advantageously, the first current estimation $W_1$ may account for the errors induced by uncertainties in respect of said physical quantity measurements (see FIG. 7).

Furthermore, the acquisition means 33 are configured to acquire at each current time a minimum current air flow rate data item $W_{ECS}$ from an electronic module 41 of the aircraft. The minimum current air flow rate data item $W_{ECS}$ is defined on the basis of the predetermined flow rate tables in relation with the cabin air-conditioning ECS (Environmental Control System).

The flow rate tables are predetermined configurations by the aircraft manufacturer expressing ECS air collection flow rate set-points for the aircraft cabin based on altitude. These tables only account for the flow rate of air collected for the cabin and thus correspond to minimum air flow rate data.

Figure 3:
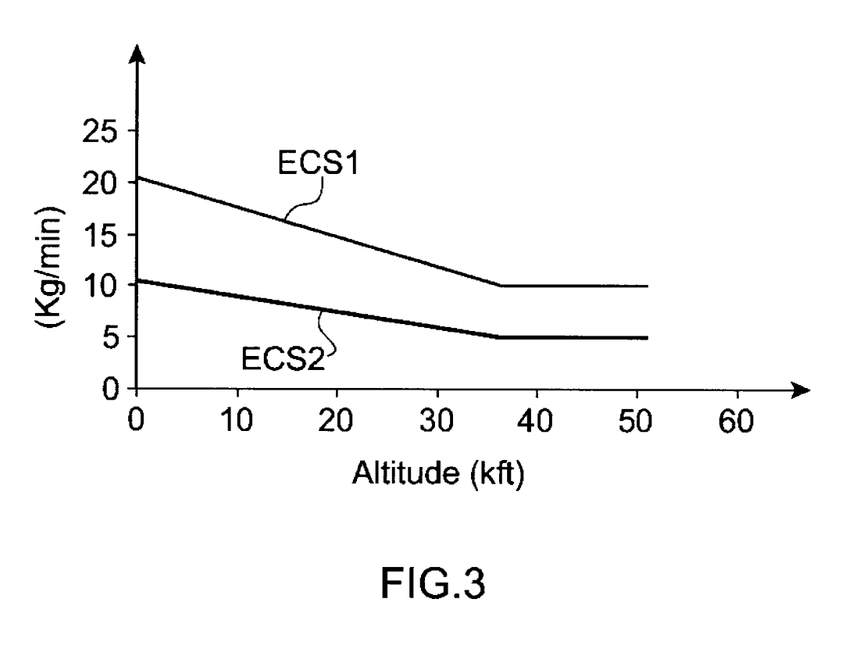
FIG. 3 is a graph schematically representing the air flow rate set-points.

FIG. 3 is a graph schematically representing the ECS air flow rate set-points. This graph represents an example of variation of the air flow rate (in kg/min) as a function of altitude (in kilofeet kft). The curve ECS1 represents the flow rate set-points as a function of altitude in a configuration for collecting air from one engine, called "Mono Flow". The curve ECS2 represents the flow rate set-points in a configuration for collecting air from two engines, called "Dual Flow".

Furthermore, the electronic module 41 of the aircraft comprises input means 411 and recovery means 413. The input means 411 are intended to receive data relating to the altitude Alt of the aircraft and the control Cd of the selected air collection configuration. The recovery means 413 are intended to reconstruct the air flow rate set-point on the basis of the predetermined flow rate tables and the altitude.

As such, based on the control Cd operated in the cockpit by a pilot of the aircraft to select the collection configuration, and based on the current altitude Alt of the aircraft, the recovery means 413 reconstruct with certainty the air flow rate to be collected from the engine(s) for conditioning the cabin and thus provide the minimum current air flow rate data item $W_{ECS}$ to the acquisition means 33.

The computing means 35 then perform at the current time a hybridisation of the first current air flow rate estimation $W_1$ and the minimum current air flow rate data item $W_{ECS}$ to form a second current air flow rate estimation $W_2$.

Hybridisation consists for example of selecting over different intervals either of the data items (i.e. first estimation or minimum air flow rate data item), on the basis of the degree of precision or reliability of each of the data items.

More particularly, it should be noted that the first air flow rate estimation is not suitable for use at low flow rates. Indeed, at low flow rates, the pressure loss measurement at the terminals of the PCE 11 is of the same order of magnitude as the precision of the differential pressure sensor. The error being based on a percentage of the full scale, it is thus not possible both to measure low flow rates (by measuring pressure losses) and cover the entire scale.

Figure 4:
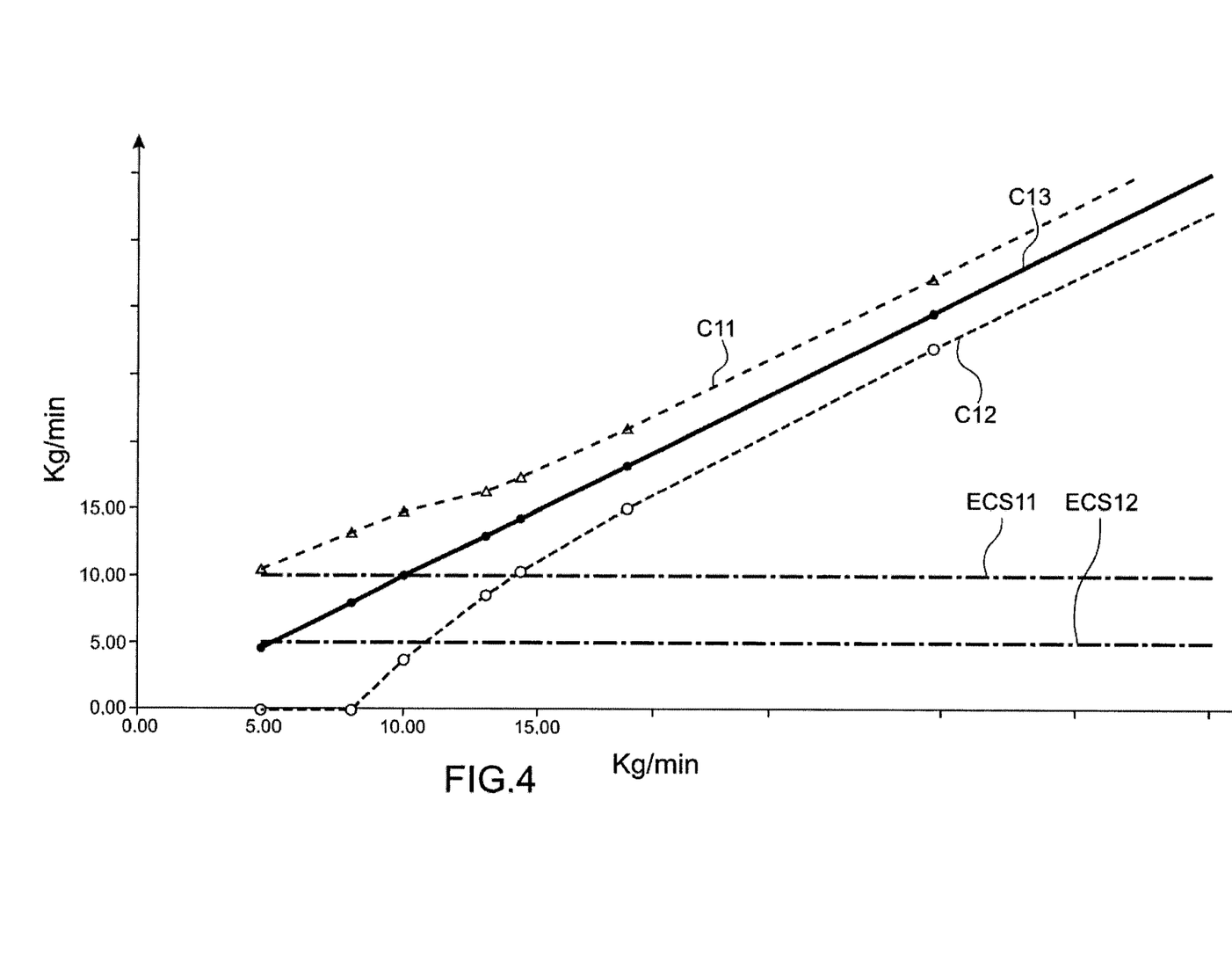
FIG. 4 shows the dispersion of errors made during the evaluation of an air flow rate estimation, according to the invention.

Indeed, FIG. 4 shows, very schematically, the dispersion of errors made during the evaluation of the first air flow rate estimation.

The X-axis corresponds to the actual air collection flow rate in kg/min and the Y-axis corresponds to the air collection flow rate in kg/min estimated on the basis of the pressure loss measurements.

The dotted-line curves C11 and C12 correspond respectively to the upper and lower dispersed measurements defining a first zone of first air flow rate estimations $W_1$. The curve C13 represents the nominal air flow rate measurements.

The horizontal curves ECS11 and ECS12 represent the ECS minimum air flow rate data (for example, at approximately 44 kft) for the Mono Flow Dual Flow configurations respectively.

These curves show that, at low flow rates, the error made on the flow rate measurement is comparable to the measurement itself. In particular, for measurements subject to low dispersion, the flow rate only becomes different to zero when the flow rate measurement exceeds the error thereof, as illustrated on the curve C12. By way of example, for an actual flow rate of 7 kg/min, the flow rate estimation computed may indicate 0 kg/min or 14 kg/min. As such, the first air flow rate estimation is not suitable for use at low flow rates.

Advantageously, the hybridisation then consists of selecting the greatest value between said first current air flow rate estimation $W_1$ and the minimum current air flow rate data item $W_{ECS}$. As such, the flow rate measurement is saturated with low values at the minimum flow rate value. In other words, the first current estimation is selected in the range of high flow rates (for example, greater than 15 kg/min) whereas the minimum current air flow rate data item $W_{ECS}$ is selected in the range of low flow rates (for example, less than 15 kg/min).

Figure 5:
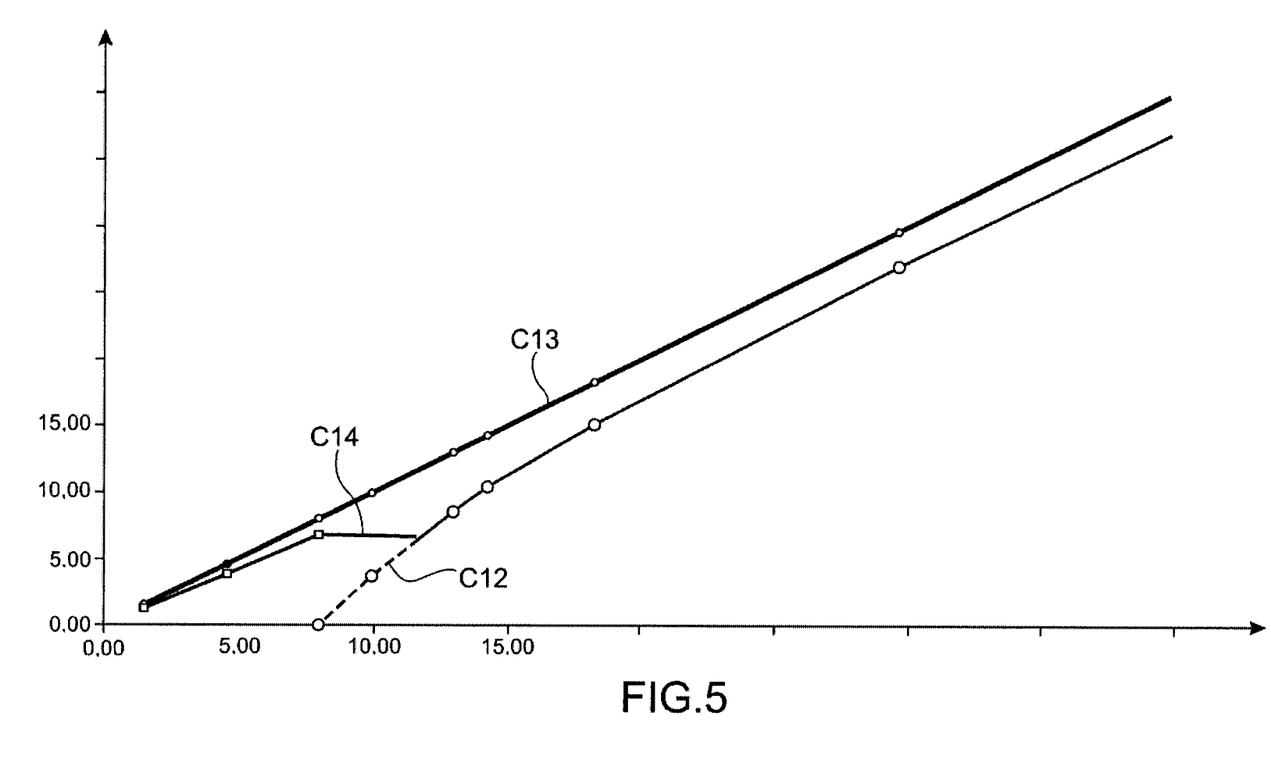
FIG. 5 shows the correction made by hybridisation when the computed flow rate is subject to low dispersion, according to the invention.

FIG. 5 shows, very schematically, the correction made by hybridisation when the computed flow rate is subject to low dispersion.

The curve C13 is the same as that in FIG. 4 and thus represents the nominal curve.

The curve C14 represents the correction made to the low measurements and corresponds to a juxtaposition between the minimum air flow rate data $W_{ECS}$ in the low flow rate range and the first air flow rate estimations $W_1$ in the supplementary range.

It should be noted that the actual flow rate may comprise the anti-ice nacelle air flow rate WAI not included by the minimum air flow rate data and the air flow rate estimations.

Advantageously, in order to account for the nacelle air flow rate, the computing means 35 evaluate a third current air flow rate estimation by increasing the second current air flow rate estimation $W_2$ by an additional current anti-ice nacelle air flow rate value collected from the engine.

Figure 6:
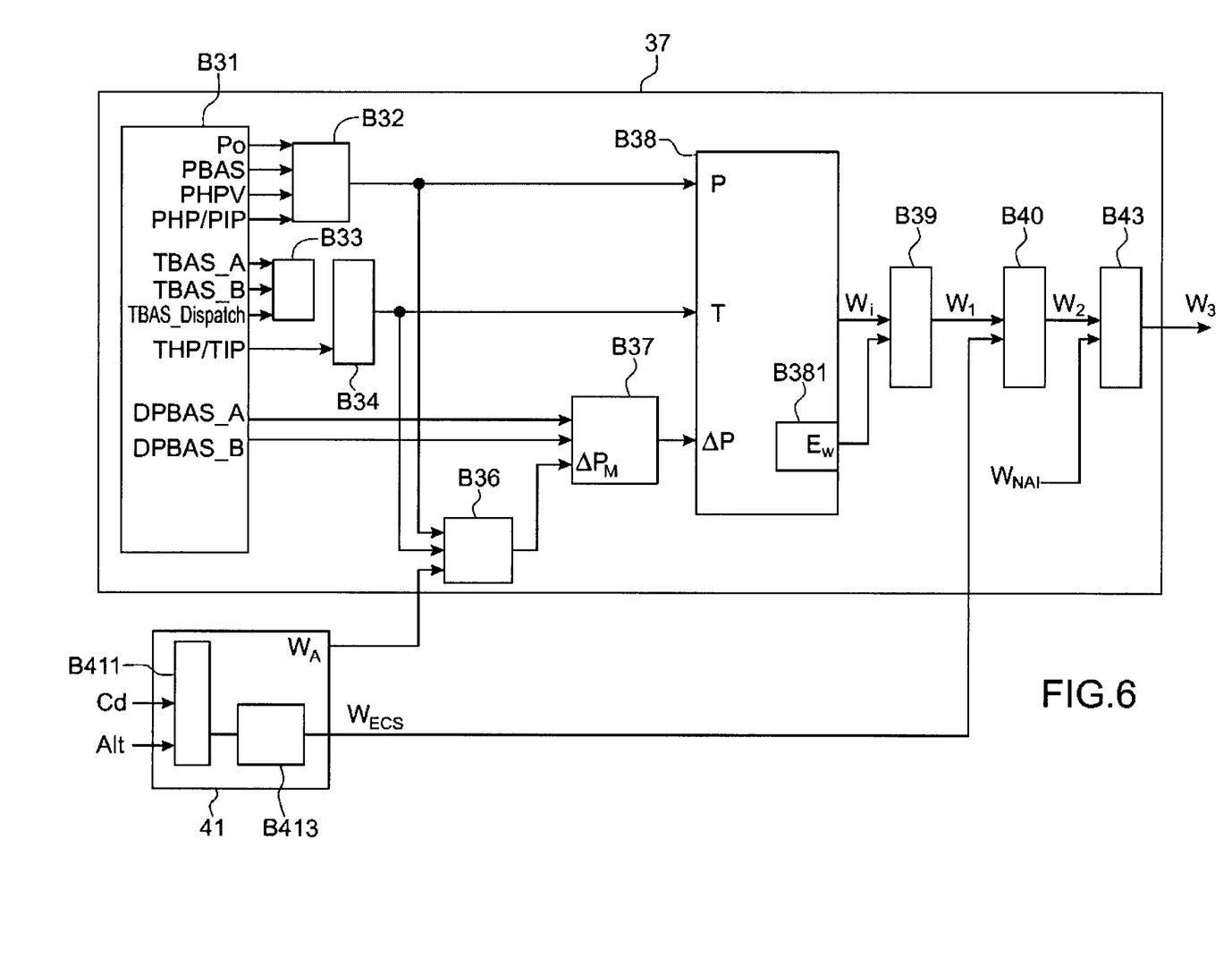
FIG. 6 is a block diagram illustrating steps of real-time estimations of the flow rate of air collected from the engine, according to different embodiments of the invention.

FIG. 6 illustrates a block diagram of the real-time estimations of the flow rate of air collected from the engine, according to advantageous embodiments of the invention.

The operations described by the block diagram are implemented by the determining device integrated in the computer 37 controlling the engine 39.

The blocks B31 relates to the acquisition by the computer 37, of the specific measurements with respect to the engine 39 and more particularly the BAS air collection system 1. In general, each measurement is acquired by two redundant channels of the computer.

As such, the input data (block B31) comprise a measurement of the ambient pressure P0, a pressure measurement PBAS downstream from the PCE heat exchanger 11, a pressure measurement PHPV upstream from the PCE 11, pressure measurements PHP and PIP of the input ports HP and IP respectively, three independent temperature measurements TBAS_A, TBAS_B and TBAS-Dispatch downstream from the PCE 11, temperature measurements THP and TIP of the input ports HP and IP respectively, and two pressure loss measurements DPBAS_A and DPBAS_B at the terminals of the PCE exchanger 11.

The blocks B32-B37 are intended to ensure the validity of the measurements by consolidating same before evaluating the first current air flow rate estimation.

The computer 37 is generally configured to consolidate a measurement by analysing the inputs in order to verify whether the measurement is not deviant. This analysis is carried out in the computer software and may include likelihood and deviation tests.

The likelihood test is based on the comparison of an input to a minimum threshold and a maximum threshold to verify whether the input is situated within or outside a likelihood range.

The deviation test (or cross-check) is carried out between the two redundant measurement channels or between the measurement of one of the channels and a reference measurement or a corresponding model.

The block B32 relates to the consolidation of the pressure measurement PBAS downstream from the PCE 11 supplied by the sensor 9f (PBAS sensor) used in formula (1) for computing the air flow rate.

It should be noted that it is not necessary to render the pressure measurement PBAS redundant solely for the purposes of monitoring the BAS air collection system 1. As such, to limit the cost, size and mass of the sensors on the engine 39, the pressure measurements may be rendered analytically redundant according to a predefined pressure model on the basis of the other pressure measurements PHPV, PHP and PIP.

As such, in the block B32, the computer 37 compares the pressure measurement PBAS to the analytical pressure model of PBAS to consolidate the measurement.

It should further be noted that the pressure PBAS is a relative measurement and the ambient pressure P0 is thus added thereto to obtain the full measurement of the pressure downstream from the PCE 11. As such, at the output of the block B32, the consolidated measurement of the pressure P is available.

The block B33 relates to the consolidation of the temperature measurement. For the purposes of temperature monitoring and regulation, the BAS air collection system 1 comprises two independent temperature measurements TBAS_A and TBAS_B, each being acquired for one of the two channels of the computer 37. As such, in the full-up configuration (i.e. both channels are sound), it is possible to carry out the monitoring and regulation functions independently. On the other hand, in the "single-channel dispatch" configuration (i.e. only one channel active and the other lost), it becomes impossible to carry out these two functions independently as the measurement connected to the channel at fault is a lost measurement. These scenarios thus require the addition of a third measurement called TBAS-Dispatch (acquired by another computer), substituting the measurement not acquired by the lost channel.

The measurement TBAS being initially redundant, the computer 37 implements a consolidation strategy comprising likelihood and deviation tests. The computer 37 first compares each measurement obtained to the minimum and maximum acceptable thresholds. When the two measurements are sound, the computer 37 checks that the two measurements are not deviating from each other. Otherwise, this means that one of the measurements is incorrect (or both). However, detecting a deviation between the measurements does not make it possible to locate the measurement at fault. The measurement TBAS-Dispatch is used as an arbiter to locate the measurement at fault in order to reset the configuration to the sound measurement.

Then in the block B34, the mean is computed between the consolidated temperature measurement downstream from the PCE 11 from the block B33 and the temperature (THP or TIP) of the selected input port (HP port or IP port).

At the output of the block B34, the consolidated measurement of the temperature T is obtained, which will be used to compute the collected air flow rate.

The blocks B36-B37 relates to the consolidation of the pressure loss measurement DPBAS.

The measurement DPBAS does not meet any initial need of the BAS air collection system 1, but merely makes it possible to measure the collected air flow rate. For redundancy purposes, two sensors 9c (DPBAS sensor) are installed at the terminals of the PCE 11 (see FIG. 1).

When the two pressure loss measurements DPBAS_A and DPBAS_B of both channels are sound in relation to the likelihood test, the computer 37 carries out a deviation test therebetween to detect whether one of the two measurements is at fault (or both). However, detecting a deviation between the measurements does not make it possible to locate the measurement at fault. As such, to arbitrate the deviation faults, the computer 37 performs a deviation test between the measurement of each channel and a corresponding model based on the air collection flow rate measurement $W_A$ from a digital module 51 of the aircraft. It should be noted that the flow rate measurement $W_A$ from the aircraft is not suitable for direct use in engine control logics for reliability reasons.

The pressure loss model is embodied by inverting formula (1) to express a reconstructed pressure loss $\Delta P_M$ as a function of the air flow rate $W_A$, the pressure P and the temperature T according to the following formula:

$$\Delta P_M = -P + \sqrt{P^2 + 2TkW_A^\alpha} \qquad (2)$$

As such, in the block B36, the reconstructed pressure loss $\Delta P_M$ is computed as a function of an air flow rate measurement $W_A$ from the aircraft, the pressure P from the block B32 and the temperature T from the block B34 according to the formula above.

In the block B37, the computer 37 performs a deviation test on the measurements DPBAS_A and DPBAS_B to detect faults. If no deviation fault arises (i.e. both DPBAS measurements are sound), the computer 37 selects the mean of the two measurements DPBAS_A and DPBAS_B. On the other hand, if a deviation fault arises (i.e. one of the two measurements is incorrect), the computer 37 selects the closest measurement to the reconstructed pressure loss $\Delta P_M$.

In the block B38, the computer 37 determines a consolidated current air flow rate value by evaluating an intermediate current estimation $W_i$ of the flow rate of air collected from the aircraft engine 39 based on the consolidated measurements in respect of pressure loss $\Delta P$, pressure P and temperature T, according to the following formula:

$$W_i = \sqrt[\alpha]{\frac{\left(P + \frac{\Delta P}{2}\right) \times \Delta P}{T \times k}} \qquad (3)$$

Advantageously, the computer corrects the intermediate current air flow rate estimation $W_i$ accounting for the uncertainties $\varepsilon_P$, $\varepsilon_T$, $\varepsilon_{\Delta P}$, and $\varepsilon_k$ relating to the pressure, temperature and pressure loss measurements read by the sensors and the experimental constant k, respectively.

Indeed, FIG. 7 shows very schematically any errors made on the flow rate measurement based on the collected air flow rate.

The solid curve C31 represents the error made on the air flow rate estimation and the dotted-line curve C32 indicates the maximum permitted tolerance after which the pumping zone is entered. These curves are given herein very schematically and as an indication and are obviously dependent on the specificities of the engine.

It should be noted that, at low flow rates (i.e. less than approximately 15 kg/min), the error made on the flow rate estimation is relatively high and exceeds the tolerance curve C32. Furthermore, the variation of the error curve C31 in relation to the tolerance curve C32 is not suitable for expressing the measurement error with a mere constant or a mere algorithm based on the flow rate.

Advantageously, in the block B381, the computer expresses the current flow rate error $E_W$ as a percentage of the product $kW^\alpha$ and estimates this error $E_W$ based on a quadratic sum of the individual current errors relating to each of the measurements induced by the uncertainties $\varepsilon_P$, $\varepsilon_T$, $\varepsilon_{\Delta P}$, and $\varepsilon_k$ thereof, according to the following formula:

$$E_W = \sqrt{\left(\frac{\varepsilon_P}{P+\frac{\Delta P}{2}}\right)^2 + \left(\frac{\varepsilon_T}{T}\right)^2 + \left(\frac{\varepsilon_{\Delta P}}{\Delta P} + \frac{\varepsilon_{\Delta P}}{2 \cdot \left(P+\frac{\Delta P}{2}\right)}\right)^2 + \varepsilon_k^2} \times kW_i^\alpha \quad (4)$$

Indeed, the computer first evaluates the individual current errors relating to each of the measurements. This may be performed by estimating the individual current error made on the product $k \times W_i^\alpha$ by each measurement uncertainty based on a development limited to the first order or based on a mere development of the flow rate computation formula.

More particularly, the individual current error $E_{\Delta P}$ relating to the pressure loss made on the product $k \times W_i^\alpha$ is given by the following expression:

$$E_{\Delta P} = \left(\frac{\varepsilon_{\Delta P}}{\Delta P} + \frac{\varepsilon_{\Delta P}}{2\left(P+\frac{\Delta P}{2}\right)}\right) \times kW_i^\alpha$$

The individual current error $E_P$ relating to the pressure made on the product $k \times W_i^\alpha$ is given by the following expression:

$$E_P = \frac{\varepsilon_P}{P+\frac{\Delta P}{2}} \times kW_i^\alpha$$

The individual current error $E_T$ relating to the temperature made of the product $k \times W_i^\alpha$ is given by the following expression:

$$E_T = \frac{\varepsilon_T}{T} \times kW_i^\alpha$$

Finally, the individual current error $E_k$ relating to the constant k made on the product $k \times W_i^\alpha$ is given by the following expression:

$$E_k = \varepsilon_k \times kW_i^\alpha$$

As such, the current flow rate error $E_W$ is computed based on the quadratic sum of the individual current errors relating to each of the measurements. The quadratic sum is justified in that the various measurements are all independent from each other and that they are tainted with errors distributed according to a normal law.

It is thus possible to estimate at each time interval the current maximum error liable to be made on the product $k \times W_i^\alpha$.

By way of example, the uncertainty $\varepsilon_P$ on the pressure is in the region of 0.3 bar; the uncertainty $\varepsilon_T$ on the temperature is in the region of 10K; the uncertainty $\varepsilon_{\Delta P}$ on the pressure loss is in the region of 0.11 psi; and the uncertainty $E_k$ on the experimental constant k is in the region of 10%.

In the block B39, the computer 37 determines a first current air flow rate estimation $W_1$ by computing the difference between the intermediate current air flow rate estimation $W_i$ and the current flow rate error $E_W$.

In other words, the current air flow rate value comprises a correction based on the subtraction of the current air flow rate error from the intermediate current air flow rate estimation. As such, if the intermediate current flow rate estimation $W_i$ is subject to high dispersion, the correction lowers the flow rate to the nominal value thereof making it possible to ensure that the flow rate is not overestimated and thus protect the engine with respect to the pumping effect.

In the block B40, the computer 37 determines a second current air flow rate estimation $W_2$ by selecting for example the greatest value between the first current air flow rate estimation $W_1$ from the block B39 and minimum current air flow rate data item $W_{ECS}$ from the block 8413 and defined on the basis of the flow rate tables, pilot control Cd and the altitude Alt (block B411).

Furthermore, in the block B43, the computer 37 evaluates a third current air flow rate estimation $W_3$ by increasing the second current air flow rate estimation $W_2$ by an additional current anti-ice nacelle air flow rate value $W_{NAI}$ collected from the engine 39. The estimation of the additional current value $W_{NAI}$ is based on the permeability of the anti-ice nacelle NAI 19 and the regulation of the flow rate of the anti-ice nacelle NAI 19 by a pressure saturation performed with the NAIV valve 7e (see FIG. 1).

The aim of the present invention is also that of adjusting the current fuel flow rate threshold value (or acceleration stop B) of the engine so as to retain a satisfactory acceleration margin accounting for the current air flow rate value. The determination of the current air flow rate value may be based on the first $W_1$, second $W_2$, or third $W_3$ current air flow rate estimation. The choice between the various air flow rate estimations may result from a compromise between simplicity and optimising the adjustment of the acceleration stop.

The invention claimed is:

1. A method for monitoring an aircraft engine by determining, in real time, flow rate of air collected from a high-pressure compressor of the aircraft engine by an air collection system of the aircraft engine, the method comprising:
    acquiring at successive times measurements of physical quantities in respect of temperature, pressure and pressure loss, specific for the air collection system, the acquiring at the successive times the measurements of the physical quantities comprising collecting data from a first sensor between an engine anti-ice nacelle and a nacelle anti-ice valve, a second sensor between the high-pressure compressor and a pressure shut-off valve, a pair of third differential pressure sensors between the pressure shut-off valve and an output of precooler, and a plurality of temperature sensors between the precooler and a bleed air shut-off valve;
    evaluating at each current time of said successive times of a first current air flow rate estimation of air collected from the high-pressure compressor of the aircraft engine on the basis of said physical quantity measurements;

acquiring at a current time of said successive times a minimum current air flow rate data item defined on the basis of a predetermined flow rate tables and according to an aircraft altitude;

selecting at said current time said first current air flow rate estimation or said minimum current air flow rate data item to form a second current air flow rate estimation, the selection being made on the basis of a degree of precision of each of the first current air flow rate estimation and the minimum current air flow rate data; and adjusting a current fuel rate threshold value of the aircraft engine based on the first current air flow rate estimation or the second current air flow rate estimation to correct acceleration stop of the aircraft engine.

2. The method according to claim 1, wherein said selecting comprises selecting the greatest value between said first current air flow rate estimation and said minimum current air flow rate data item.

3. The method according to claim 1, further comprising:
determining at said current time a third current air flow rate estimation by increasing said second current air flow rate estimation by an additional current anti-ice nacelle air flow rate value collected from the engine; and adjusting the current fuel rate threshold value of the aircraft engine based on the first current air flow rate estimation or the second current air flow rate estimation or the third current air flow rate estimation.

4. The method according to claim 1, further comprising verifying non-deviant nature of said physical quantity measurements before evaluating said first current air flow rate estimation.

5. The method according to claim 1, wherein evaluating said first current air flow rate estimation comprises:
computing said current time an intermediate current air flow rate estimation of the flow rate of air collected from the high-pressure compressor of the aircraft engine on the basis of said physical quantity measurements, computing said current time a current flow rate error induced by uncertainties in respect of said physical quantity measurements, and correcting said current time said intermediate current flow rate estimation by subtracting therefrom said current flow rate error thus determining said first current air flow rate estimation.

6. The method according to claim 1, wherein the pressure loss is measured at terminals of a heat exchanger of said air collection system.

7. The method according to claim 1, wherein said flow rate tables are air collection set-points for conditioning an aircraft cabin, and minimum current air flow rate data item is defined on the basis of a configuration selected in said flow rate tables and the aircraft altitude.

8. A device for monitoring an aircraft engine by determining, in real time, flow rate of air collected from a high-pressure compressor of the aircraft engine by an air collection system of the aircraft engine, the device comprising:
circuitry configured to
acquire at successive times measurements of physical quantities in respect of temperature, pressure and pressure loss, specific for the air collection system, acquiring at the successive times the measurements of the physical quantities comprising collecting data from a first sensor between an engine anti-ice nacelle and a nacelle anti-ice valve, a second sensor between the high-pressure compressor and a pressure shut-off valve, a pair of third differential pressure sensors between the pressure shut-off valve and an output of precooler, and a plurality of temperature sensors between the precooler and a bleed air shut-off valve, evaluate at each current time of said successive times a first current air flow rate estimation of air collected from the high-pressure compressor of the aircraft engine on the basis of said physical quantity measurements, acquire at a current time of said successive times a minimum current air flow rate data item defined on the basis of a predetermined flow rate tables and according to an aircraft altitude, select, at said current time, said first current air flow rate estimation or said minimum current air flow rate data item to form a second current air flow rate estimation, the selection being made on the basis of a degree of precision of each of the first current air flow rate estimation and the minimum current air flow rate data, and adjust a current fuel rate threshold value of the aircraft engine based on the first current air flow rate estimation or the second current air flow rate estimation to correct acceleration stop of the aircraft engine.

9. A non-transitory computer-readable storage medium including computer executable instructions, wherein the instructions, when executed by a computer, cause the computer to perform a method for monitoring an aircraft engine, the method comprising:
acquiring at successive times measurements of physical quantities in respect of temperature, pressure and pressure loss, specific for an air collection system, the acquiring at the successive times the measurements of the physical quantities comprising collecting data from a first sensor between an engine anti-ice nacelle and a nacelle anti-ice valve, a second sensor between a high-pressure compressor and a pressure shut-off valve, a pair of third differential pressure sensors between the pressure shut-off valve and an output of precooler, and a plurality of temperature sensors between the precooler and a bleed air shut-off valve;

evaluating at each current time of said successive times of a first current air flow rate estimation of air collected from the high-pressure compressor of the aircraft engine on the basis of said physical quantity measurements;

acquiring at a current of said successive times time a minimum current air flow rate data item defined on the basis of a predetermined flow rate tables and according to an aircraft altitude;

selecting at said current time said first current air flow rate estimation or said minimum current air flow rate data item to form a second current air flow rate estimation, the selection being made on the basis of a degree of precision of each of the first current air flow rate estimation and the minimum current air flow rate data; and adjusting a current fuel rate threshold value of the aircraft engine based on the first current air flow rate estimation or the second current air flow rate estimation to correct acceleration stop of the aircraft engine.

* * * * *

UNITED STATES PATENT AND TRADEMARK OFFICE
CERTIFICATE OF CORRECTION

PATENT NO. : 10,571,316 B2
APPLICATION NO. : 14/441065
DATED : February 25, 2020
INVENTOR(S) : Bruno Robert Gaully et al.

It is certified that error appears in the above-identified patent and that said Letters Patent is hereby corrected as shown below:

In the Specification

Column 1, Line 42, delete "(C/$P_r$," and insert -- (C/$P_c$, --, therefor.

Column 12, Line 4, delete "$E_k$" and insert -- $\varepsilon_k$ --, therefor.

Column 12, Line 22, delete "8413" and insert -- B413 --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*